United States Patent [19]

Ellerhorst et al.

[11] Patent Number: 5,115,979
[45] Date of Patent: May 26, 1992

[54] CONFORMING PLUNGER SEAL ASSEMBLY

[75] Inventors: Robert J. Ellerhorst, Cincinnati; Robert H. Kraimer, W. Chester, both of Ohio

[73] Assignee: General Electric Company, Cincinnati, Ohio

[21] Appl. No.: 706,537

[22] Filed: May 28, 1991

[51] Int. Cl.$^5$ .............................................. B64C 9/38
[52] U.S. Cl. .......................... 239/265.37; 239/265.35; 239/127.3
[58] Field of Search ......... 239/265.19, 265.33–265.39, 239/127.3; 60/230, 266

[56] References Cited

U.S. PATENT DOCUMENTS

| | | | |
|---|---|---|---|
| 3,121,995 | 2/1964 | Albani | 60/39.32 |
| 3,354,649 | 11/1967 | Madden | 60/271 |
| 4,047,742 | 9/1977 | Haferkamp et al. | 285/187 |
| 4,093,157 | 6/1978 | Cavanagh, Jr. et al. | 244/53 R |
| 4,110,972 | 9/1978 | Young et al. | 60/230 |
| 4,575,006 | 3/1986 | Madden | 239/265.37 |
| 4,575,099 | 3/1986 | Nash | 239/265.37 |
| 4,650,397 | 3/1987 | Rogo | 415/139 |
| 4,657,264 | 4/1987 | Wehber | 277/118 |
| 4,739,932 | 4/1988 | Szuminski et al. | 239/265.33 |
| 4,783,085 | 11/1988 | Wicks et al. | 277/12 |
| 4,813,608 | 3/1989 | Holowach et al. | 239/265.37 |
| 4,917,302 | 4/1990 | Steinetz et al. | 239/265.11 |

Primary Examiner—Andres Kashnikow
Assistant Examiner—Karen B. Merritt
Attorney, Agent, or Firm—Jerome C. Squillaro; David L. Narciso

[57] ABSTRACT

A seal assembly is provided between an exhaust flap and a nozzle sidewall of a gas turbine engine exhaust nozzle. The assembly includes a housing fixedly joined to the exhaust flap and a plurality of adjoining plungers slidably disposed in the housing and each including a top extending outside a housing opening for defining a seal line for contacting the nozzle sidewall for sealing the exhaust gases from flowing therebetween. The seal lines collectively define a seal first contour being complementary to a first contour of the nozzle sidewall. A tie rod extends through the plungers and joins the plungers to the housing. The tie rod is flexible for allowing the plungers to rotate perpendicularly to the tie rod so that the seal lines collectively form a seal second contour, different than the seal first contour, to conform to a second contour of the nozzle sidewall which is different than the nozzle sidewall first contour.

12 Claims, 5 Drawing Sheets

CONFORMING PLUNGER SEAL ASSEMBLY

The government has rights in this invention in accordance with Contract No. F33657-83C-0281 awarded by the Department of the Air Force.

Technical Field

The present invention relates generally to an exhaust nozzle for a gas turbine engine, and, more specifically, to a seal assembly for a movable exhaust flap adjacent to a nozzle sidewall.

BACKGROUND ART

A gas turbine engine effective for powering an aircraft at supersonic flight typically includes a variable area exhaust nozzle having primary and secondary exhaust flaps which are joined together to define a throat of minimum flow area with a converging channel defined by the primary flaps and a diverging flow channel defined by the secondary flaps. The primary and secondary flaps are conventionally movable between a generally closed position having a minimum throat area and a minimum outlet area at the aft end of the secondary flaps, and to a generally fully open position having a maximum throat area and a maximum outlet area.

Such converging-diverging (C-D) exhaust nozzles may either be axisymmetric or two-dimensional, or rectangular. In a two-dimensional C-D nozzle, the primary and secondary flaps extend transversely between a pair of spaced, nozzle sidewalls which collectively bound the exhaust gases being channeled therethrough. Since the primary and secondary flaps move relative to the stationary sidewalls, suitable seals are typically provided therebetween for reducing, if not eliminating, leakage of the exhaust gases from the converging and diverging channels, between the flaps and the sidewall, and outwardly therefrom. Leakage of the hot exhaust gases would require suitable thermal protection of components adjacent to the exhaust nozzle including, for example, hydraulic and electrical systems. Leakage of the exhaust gases also may decrease the propulsion efficiency of the exhaust nozzle.

During operation of the engine and exhaust nozzle, the nozzle sidewall is subject to distortion due to high temperatures thereof, or pressure forces from the exhaust gases, or both. Such distortion may be in the form of a bow which may occur in the transverse direction of the exhaust nozzle generally parallel to the exhaust flaps and the longitudinal centerline axis. A conventional exhaust flap seal at the nozzle sidewall typically includes a straight seal which would contact the bowed sidewall at only two points leaving an arcuate gap between the bowed sidewall and the seal through which the exhaust gases will leak.

Furthermore, in one embodiment or a two-dimensional exhaust nozzle, the secondary exhaust flaps are disposed fully between the adjacent sidewalls when in the closed position. However, when the secondary flaps are disposed in the open position, the downstream end portions thereof extend freely over edges of the nozzle sidewalls. In this latter condition, portions of the nozzle seals will also extend over the edges of the nozzle sidewall. Accordingly, the nozzle seal must be suitably joined to the secondary flap to ensure that it does not separate from the flap in the open position, and that it smoothly slides back against the nozzle sidewall as the secondary flap is moved toward the closed position.

OBJECTS OF THE INVENTION

Accordingly, one object of the present invention is to provide a new and improved seal assembly for a two-dimensional gas turbine engine exhaust nozzle.

Another object of the present invention is to provide a seal assembly effective for conforming to bowing of the sidewall of the two-dimensional exhaust nozzle.

Another object of the present invention is to provide a seal assembly which retains continuity thereof when portions thereof are disposed over an edge of the nozzle sidewall.

DISCLOSURE OF INVENTION

A seal assembly is provided between an exhaust flap and a nozzle sidewall of a gas turbine engine exhaust nozzle. The assembly includes a housing fixedly joined to the exhaust flap and a plurality of adjoining plungers slidably disposed in the housing and each including a top extending outside a housing opening for defining a seal line for contacting the nozzle sidewall for sealing the exhaust gases from flowing therebetween. The seal lines collectively define a seal first contour being complementary to a first contour of the nozzle sidewall. A tie rod extends through the plungers and joins the plungers to the housing. The tie rod is flexible for allowing the plungers to move perpendicularly relative to the tie rod so that the seal lines collectively form a seal second contour, different than the seal first contour, to conform to a second contour of the nozzle sidewall which is different than the nozzle sidewall first contour.

BRIEF DESCRIPTION OF DRAWINGS

The novel features believed characteristic of the invention are set forth and differentiated in the claims. The invention, in accordance with a preferred, exemplary embodiment, together with further objects and advantages thereof, is more particularly described in the following detailed description taken in conjunction with the accompanying drawing in which:

MODE(S) FOR CARRYING OUT THE INVENTION

Figure 1:
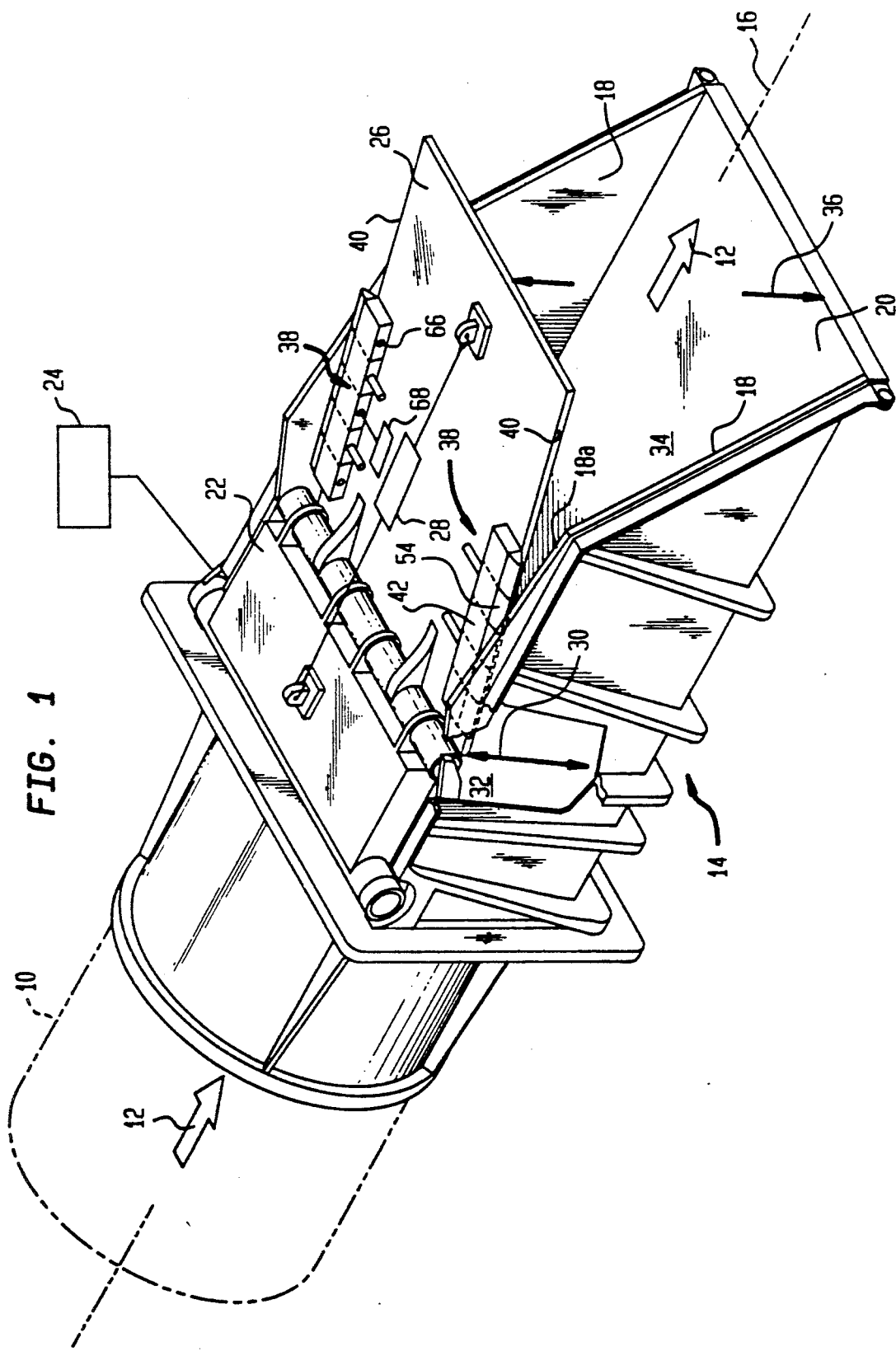
FIG. 1 is a perspective schematic view of an exemplary two-dimensional exhaust nozzle, shown in an open position, for a gas turbine engine including a seal assembly in accordance with one embodiment of the present invention.

Illustrated in FIG. 1 is a schematic, perspective view of a conventional augmented gas turbine engine shown in phantom line schematically at 10 which discharges exhaust gases 12 into an exemplary two-dimensional exhaust nozzle 14. In this exemplary embodiment, the nozzle 14 includes a longitudinal axis 16 and a pair of opposing, flat, nozzle sidewalls 18 spaced transversely outwardly from the longitudinal axis 16 for bounding the exhaust gases 12. A flat nozzle base-wall 20 is integrally joined between the sidewalls 18 for also bounding the exhaust gases 12.

A generally rectangular primary exhaust flap 22 is conventionally pivotally supported to the exhaust nozzle 14 at upstream ends of the sidewall 18 and is pivotable by conventional first rotating means 24 joined thereto. A generally rectangular secondary exhaust flap 26 is conventionally pivotally supported to the downstream end of the primary flap 22 and is pivotable relative thereto by a conventional second rotating means 28.

In the exemplary embodiment of the exhaust nozzle 14 illustrated in FIG. 1, only a single primary flap 22 and a single secondary flap 26 are utilized for varying the flow of the exhaust gases 12 along the sidewalls 18 and base-wall 20. However, other two-dimensional exhaust nozzles 14 could also be used wherein instead of the stationary base-wall 20 a second set of primary and secondary exhaust flaps identical to the primary and secondary flaps 22 and 26 could be utilized.

The juncture between the primary flap 22 and the secondary flap 26 defines a throat 30 of relative minimum flow area, and the primary flap 22 defines with the base-wall 20 a generally converging channel 32 which extends upstream from the throat 30, and the secondary flap 26 defines with the base-wall 20 a generally diverging channel 34 extending downstream from the throat 30. The downstream ends of the secondary flap 26 and the base-wall 20 define a generally rectangular outlet 36 for discharging the exhaust gases 12 from the nozzle 14.

Figure 2:
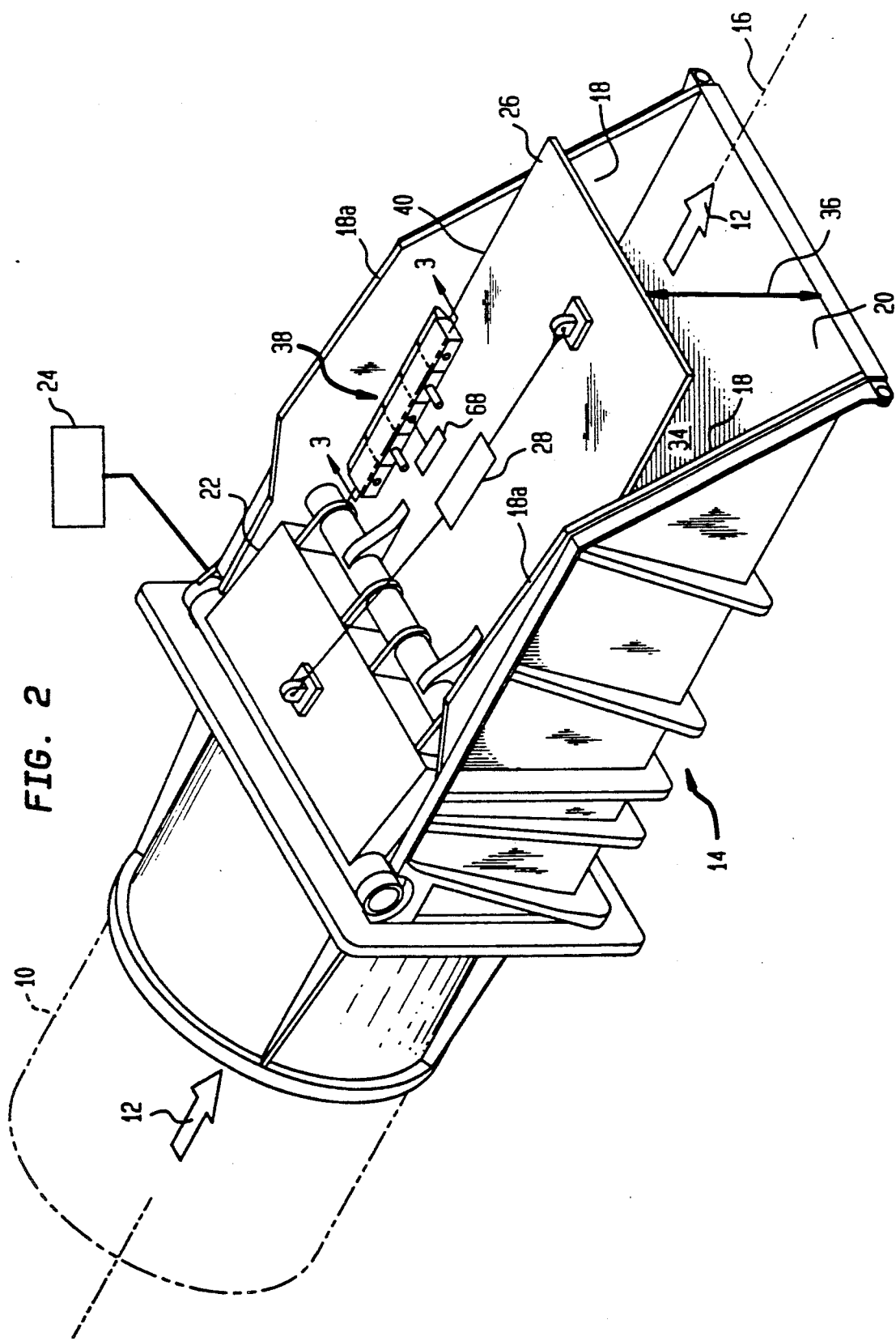
FIG. 2 is a schematic perspective view of the exhaust nozzle illustrated in FIG. 1 shown in a relatively closed position.

The rotating means 24 and 28 conventionally include hydraulic actuators and linkages for selectively varying the flow area of the exhaust gases 12 channeled through the nozzle 14. They are effective for positioning the primary and secondary flaps 22 and 26 in a fully open position as shown in FIG. 1 wherein the throat 30 and the outlet 36 have generally maximum flow areas and the secondary flap 26 diverges outwardly from the base-wall 20 with a portion thereof extending over the top edges 18a of the sidewalls 18. The rotating means 24 and 28 are also effective for moving the primary and secondary flaps 22 and 26 to the fully closed position as illustrated in FIG. 2 wherein the throat 30 and the outlet 36 have generally minimum flow areas. The primary flap 22 is, accordingly, rotated inwardly toward the base-wall 20, and the secondary flap 26 is also moved relatively close to the base-wall 20 and below the top edges 18a of the sidewalls 18.

In order to seal the movable secondary flap 26 against the sidewalls 18, a seal assembly 38 in accordance with one embodiment of the present invention is provided on each of the transverse sides 40 of the secondary flap 26 as illustrated in FIGS. 1 and 2. Each of the seal assemblies 38, as shown in more particularity in FIG. 3, includes an elongate, generally rectangular housing 42 conventionally fixedly joined to the top surface of the secondary flap 26 at the side 40. The housing 42 includes a longitudinal axis 44 disposed parallel to the nozzle longitudinal axis 16.

Figure 3:
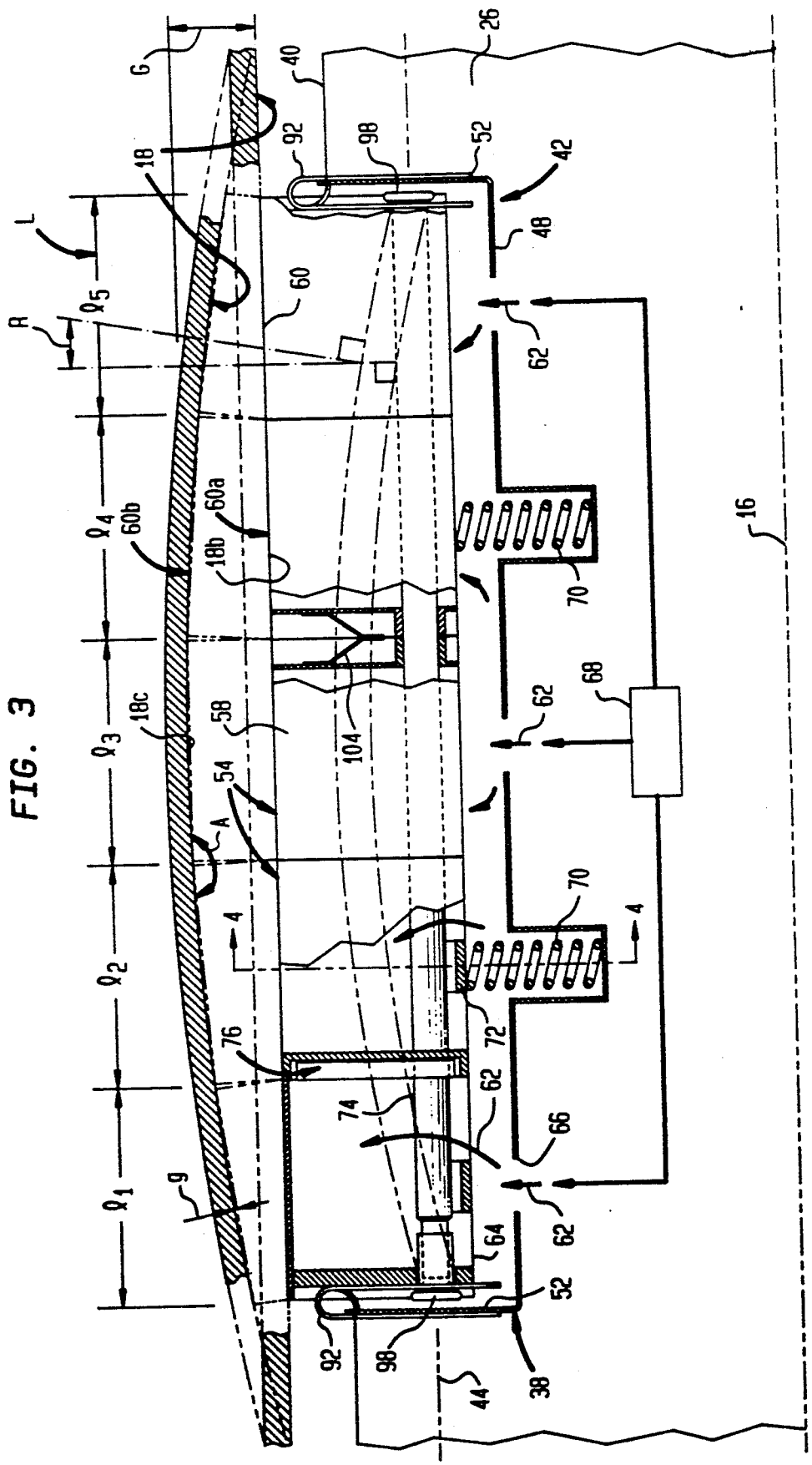
FIG. 3 is a transverse sectional view of one of the seal assemblies illustrated in FIG. 2 taken along line 3—3.
Figure 4:
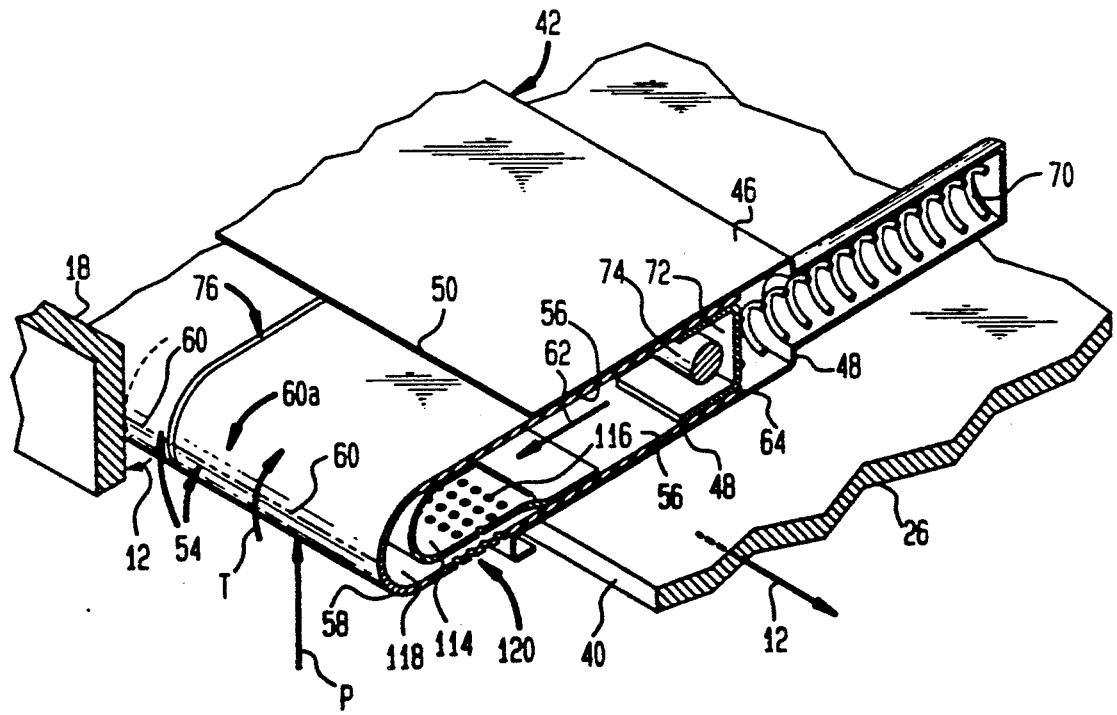
FIG. 4 is a perspective, partly sectional view, of a portion of the seal assembly illustrated in FIG. 3 taken along line 4—4.

Referring to both FIGS. 3 and 4, the housing 42 includes a pair of vertically spaced apart sidewalls 46 joined together at proximal ends thereof to an integral base 48, with the distal ends thereof defining an opening 50. The housing 42, therefore, has a U-shaped transverse profile. The housing 42 also includes a pair of longitudinally spaced endwalls 52 integrally joined to the opposite ends of the sidewalls 46 and the base 48 so that the housing 42 is in the form of an open sided rectangular box.

A plurality of adjoining seal plungers 54 are slidably disposed in the housing 42 and each includes a pair of vertically spaced apart sidewalls 56 disposed in contact with the housing sidewalls 46 for forming seals therewith, and a preferably arcuate, in transverse section, distal end, or top 58 integrally joined with the sidewalls 56. The top 58 extends outside the housing opening 50 in the lateral direction to contact the nozzle sidewall 18 for defining a seal edge or line 60 contacting the nozzle sidewall 18 for sealing the exhaust gases 12 from flowing therebetween. In this exemplary embodiment of the seal assembly 38, there are preferably five longitudinally spaced plungers 54 and respective seal lines 60, which seal lines 60 collectively define a seal first contour 60a which is complementary to a first contour 18b of the nozzle sidewall 18 as illustrated in more particularity in FIG. 3. In this exemplary embodiment, the nozzle sidewalls 18 are initially flat and undistorted and the sidewall first contour 18b is straight. Each of the plunger seal lines 60 is also preferably straight, and the seal first contour 60a is also straight so that all of the seal lines 60 fully contact the nozzle sidewall 18 for providing an effective seal therewith.

As illustrated in FIG. 3, the plungers 54 are maintained against the sidewall 18 by suitably providing a pressurized fluid such as fan or compressor air 62 inside the plungers 54 to force them against the sidewall 18. For example, each of the plungers 54 has an open base 64 defined at the proximal ends of the sidewalls 56 for receiving the pressurized air 62 through a plurality of inlets 66 in the housing base 48. The inlets 66 could alternatively be disposed through the flap 26, housing sidewall 46, and the plunger sidewall 56 to channel the air 62 from within the flap 26. Conventional means 68, shown schematically in FIGS. 1 and 3, are provided for channeling the pressurized air 62 from the fan or compressor of the engine 10 to the housings 42 of the two seal assemblies 38. The channeling means 68 may simply comprise suitable conduits for channeling the pressurized air 62 to the housings 42.

Referring again to FIGS. 3 and 4, each of the housings 42 includes at least one, and preferably a plurality, or two for example, compression springs 70 suitably joined to the housing 42 which act against respective spring supports 72 fixedly joined to the plunger sidewalls 56 at the base 64. The springs 70 urge the plungers 54 against the nozzle sidewalls 18 when the pressurized air 62 is not provided.

Referring again to FIG. 3, the plungers 54, including the seal first contour 60a, and the nozzle sidewall 18 including the sidewall first contour 18b are both shown straight and in contact with each other when the nozzle sidewall 18 is undistorted. However, due to thermal or pressure loads from the exhaust gases 12, the nozzle sidewalls 18 may bow, or assume an arcuate, concave shape in the transverse plane of the secondary flap 26 along the longitudinal axis 16. Accordingly, the nozzle sidewall 18 has a second contour 18c which is arcuate, or concave toward the plungers 54. The overall, longitudinal length L of the plungers 54 in an exemplary embodiment is about 76 cm, and the resulting maximum gap G due to the bowed sidewall 18 over the longitudinal distance L may be up to about 3.8 mm–12.7 mm, or more depending on the specific design, it being noted that the gap G illustrated in FIG. 3 is greatly exaggerated for clarity of presentation. Of course, the sidewalls 18 may also bow in the opposite direction and assume a convex shape which can also be accommodated by the invention.

A conventional straight line seal would, therefore, contact the nozzle sidewall 18 at only its two end points creating a gap therebetween varying from a zero value at the contact point to the maximum gap value G therebetween which will result in substantial leakage of the exhaust gases 12.

In accordance with one feature of the present invention, the plurality of plungers 54 are articulated so that the respective plunger tops 58 and seal lines 60 are individually positionable in contact with the nozzle sidewall 18 for reducing leakage therebetween. Since each of the seal lines 60 is straight, each of the plunger tops 58 also contacts the arcuate nozzle sidewall 18 at only its two end points, except, however, the resulting maximum gap g between each seal line 60 and the nozzle sidewall 18 is substantially reduced as compared to the maximum gap G since each of the plungers 54 has a relatively short longitudinal length, i.e., $1_1$, $1_2$, $1_3$, $1_4$, and $1_5$, in this exemplary embodiment. In accordance with the present invention, each of the plungers 54 is allowed to respectively contact the arcuate nozzle sidewall 18 in its deformed position, with the maximum gaps g being about 0.15 mm, for example, for each of the plungers 54 of equal length, i.e., the respective plunger length 1 being 1/5 of the total length L.

Accordingly, when the nozzle sidewall 18 is in its arcuate, deformed position, the straight seal lines 60 collectively form a seal second contour 60b which is piecewise straight but collectively arcuate to conform to the nozzle sidewall second contour 18c. Although the individual seal lines 60 remain straight in both the seal first contour 60a and in the seal second contour 60b, the collective seal lines 60 define a straight seal first contour 60a but an arcuate second seal contour 60b which is, accordingly, different therefrom. The seal second contour 60b is complementary to the arcuate sidewall second contour 18c to conform therewith.

In order to allow the plungers 54 to effectively and suitably articulate relative to each other, the seal assembly 38 preferably also includes an elongate tie rod 74 extending through the plungers 54 as illustrated in FIG. 3. The tie rod 74 joins the plungers 54 to the housing 42 as described in further detail below and is suitably flexible for allowing the plungers 54 to individually rotate in the transverse plane at varying rotation angles R perpendicularly to and with the tie rod 74 so that the seal lines 60 are able to collectively form the seal second contour 60b. For the exemplary bow of the sidewall 18 illustrated in FIG. 3, the right outboard plunger 54 rotates clockwise, the center plunger 54 does not rotate, and the left outboard plunger 54 rotates counterclockwise as the tie rod 74 flexes to generally match the bow of the deformed sidewall 18. The remaining two plungers rotate at intermediate values.

However, it is preferred that adjacent ones of the plungers 54 include tongue-in-groove joints 76 for preventing twisting rotation of the plungers 54 about the tie rod 74, or about the longitudinal axis 44. Referring to FIG. 4, for example, although each of the plungers 54 is sealingly and slidably disposed in the housing 42, without some means for joining together adjacent plungers 54, differential pressure loads, designated P, across the plungers 54 due to the high pressure of the exhaust gases 12, and varied friction loads between the plunger segments and sidewall for example at the sealing lines 60 thereof, will cause the plungers 54 to twist around the tie rod 74 at twist angles T. This is undesirable, for example, since if an individual plunger 54 twists about the tie rod 74 relative to an adjacent plunger 54, its respective seal line 60 could be displaced vertically relative to an adjacent seal line 60 increasing its gap g resulting in increased leakage of the exhaust gases 12 between the plunger sealing line 60 and the nozzle sidewall 18 as well as between the adjacent plungers 54.

Although such twist (T) of the plungers 54 about the tie rod 74 is undesirable, rotation (R) of the plungers 54 perpendicularly to the tie rod 74 as illustrated in FIG. 3 is desirable to allow the plungers 54 to conform to the distorted sidewall 18. As the tie rod 74 bends due to the pressurized air 62 forcing the individual plungers 54 to contact the sidewall 18, the individual plungers 54 move with, or rotate with the flexing tie rod 74 in the transverse plane, which includes the tie rod 74 and the seal lines 60. This rotation of the individual plungers 54 perpendicularly to the tie rod 74 results in obtuse angles A between adjacent seal lines 60 in the transverse plane, with the angles A each being less than 180° but substantially close to 180° since the plungers 54 need only compensate for relatively small gaps G on the order of 3.8 mm –12.7 mm for example, although larger gaps G could also be accommodated with even smaller values of the angle A. The angle A is defined relative to the inside of the bow of the sidewall 18, as shown in FIG. 3 for the concave bow, and in an opposite sense for a convex bow of the sidewall 18.

As illustrated in FIG. 4, the plunger sidewalls 56 are slidingly disposed against the housing sidewalls 46 for providing a seal therebetween for reducing leakage of the pressurized air 62 from inside the housing 42 and out through the opening 50. Leakage of the pressurized air 62 is also reduced between adjacent ones of the plungers 54 by the tongue-in-groove joints 76.

Figure 5:
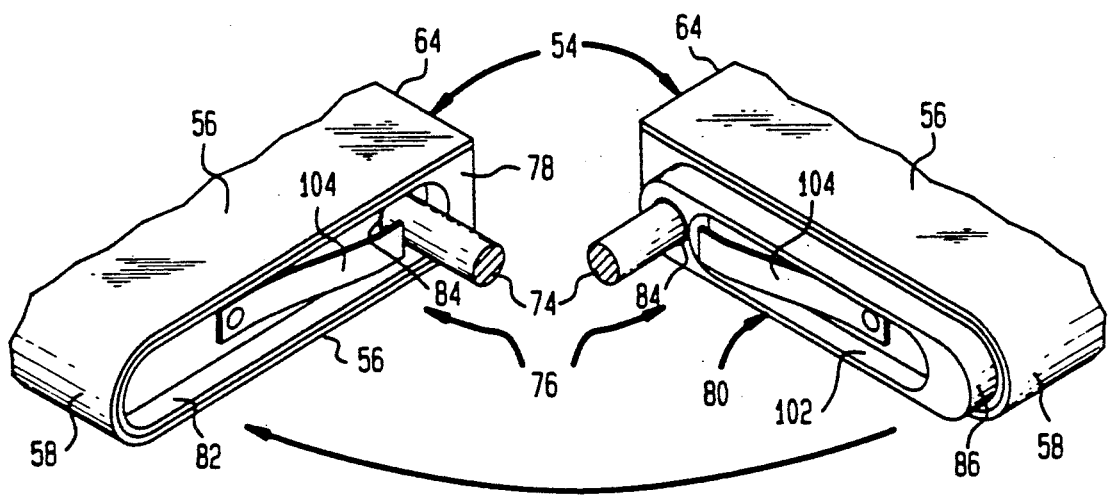
FIG. 5 is an exploded, perspective view of adjacent portions of adjacent plungers of the seal assembly illustrated in FIG. 3.

More specifically, illustrated in FIG. 5 is an exploded view of adjacent plungers 54. Each of the plungers 54 includes a pair of longitudinally spaced end-caps with a first end-cap 78 of one plunger 54 being disposed adjacent to a second end-cap 80 of an adjacent plunger 54 for mating therewith to define the tongue-in-groove joint 76. Such first and second end-caps 78 and 80, or inboard end-caps 78 and 80, are sealingly, or fixedly, joined to the respective plunger sidewalls 56 for sealing flow, or preventing internal leakage of the pressurized air 62 between adjacent ones of the plungers 54. The first end-cap 78 includes an elongate groove 82 disposed perpendicularly to the tie rod 74 and generally parallel to the plunger sidewalls 56 from the plunger top 58 to the plunger base 64. A hole 84 is disposed in the first end-cap 78 adjacent to the base 64 and through the groove 82 for rotatably supporting the plunger 54 on the tie rod 74. The second end-cap 80 has an elongate tongue 86 disposed perpendicularly to the tie rod 74 and extends generally parallel to the plunger sidewalls 56 between the base 64 and the top 58, and also includes a corresponding hole 84 for rotatably supporting the plunger 54 on the tie rod 74. The outer surface of the tongue 86 is complementary in profile to the groove 82 and is inserted therein in a relatively close fit for preventing twisting (twist angle T shown in FIG. 4) of the adjacent plungers 54 about the tie rod 74 and providing a seal therebetween. In this way, the tongue 86 and the groove 82 prevent both clockwise and counterclockwise twisting about the tie rod 74 of individual plungers 54 relative to adjacent ones of the plungers 54.

Figure 6:
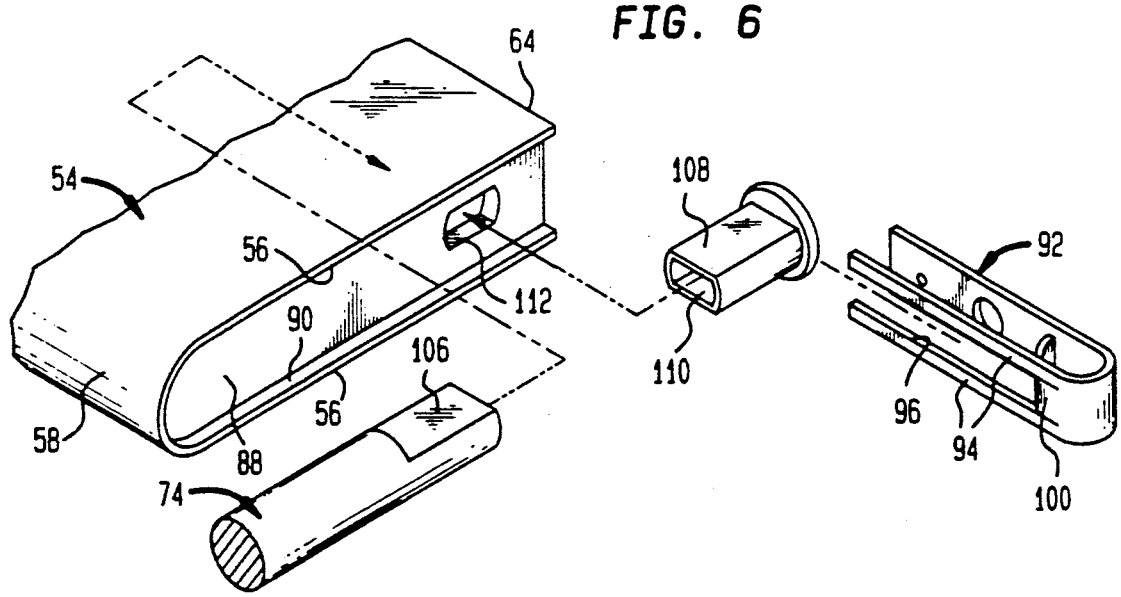
FIG. 6 is an exploded, perspective view of an outboard one of the plungers illustrated in FIG. 3 showing a tie rod flange end and retention clip.
Figure 7:
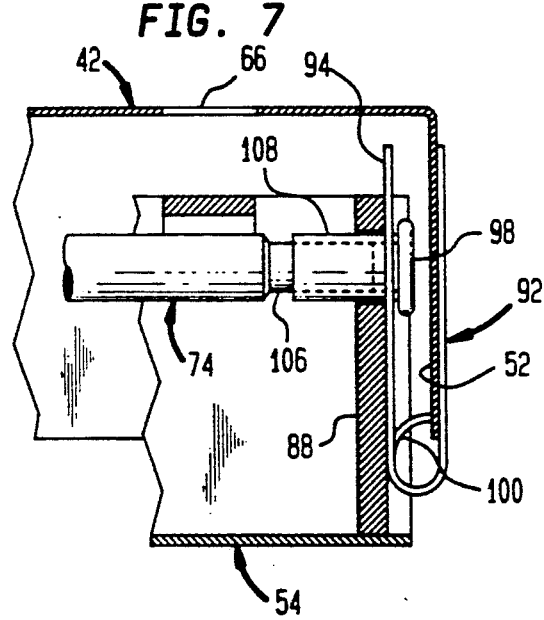
FIG. 7 is an enlarged, transverse sectional view of one of the outboard plungers illustrated in FIG. 3, including the tie rod flange end and retention clip.

As illustrated in FIGS. 1, 6, and 7, the outboard plungers 54 inside the housing 42 are disposed adjacent to the housing endwalls 52, with each outboard plunger 54 including an outboard end-cap 88 fixedly and sealingly joined to the plunger sidewall 56 and the top 58. The outboard end-cap 88 includes an elongate recess 90 disposed perpendicularly to the tie rod 74 and generally parallel to the plunger sidewalls 56 from the top 58 to the base 64.

Figure 8:
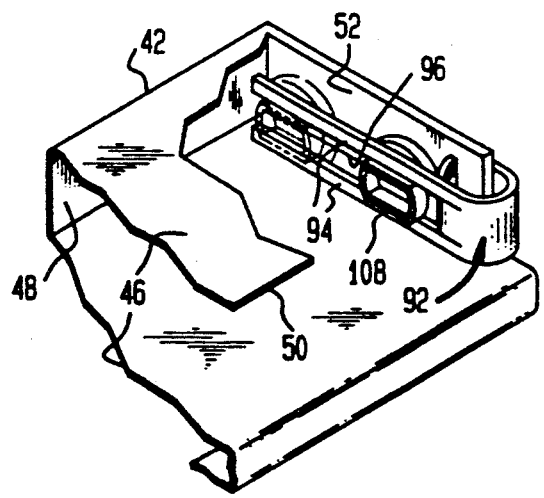
FIG. 8 is a perspective, partly sectional view of a portion of the housing of the seal assembly illustrated in FIG. 3 which receives the outboard plunger illustrated in FIG. 7, including the tie rod which is slidably joined to the retention clip.

Referring also to FIG. 8, a retention clip 92 is disposed on each housing endwall 52 and is suitably fixedly joined thereto, by being tack welded thereto for example, and includes two elongate, spaced fingers 94 defining a slot 96 therebetween. The tie rod 74 includes a pair of opposite flange ends 98 slidably joined to the housing 42 by the retention clips 92 for allowing translation of the plungers 54 outwardly through the housing opening 50, as shown in FIG. 1, in response to distortion or movement of the sidewall 18 relative to the housing 42.

More specifically, each of the flange ends 98 has a diameter greater than the spacing between the two fingers 94 for allowing the clip 92 to prevent longitudinal movement of the flange ends 98 while allowing transverse movement of the tie rod 74 along the slots 96. The retention clip 92 includes a stop 100 disposed adjacent to the housing opening 50 which prevents the tie rod 74, and the plungers 54 attached thereto, from leaving the housing 42.

Referring again to FIG. 5, each of the tongues 86 includes an elongate recess 102, and the recess 102 and the groove 82 of adjacent ones of the plungers 54 include spring biasing means in the exemplary form of a pair of opposing leaf springs 104 each fixedly joined to a respective one of the adjacent plungers 54 in the groove 82 and the tongue recess 102 by a rivet, for example, at one end thereof. The leaf springs 104 tend to separate adjacent plungers 54 for urging the opposite outboard plungers 54 against the housing, in particular the retention clip 92 in sealing contact therewith. More specifically, the leaf springs 104 urge the outboard plunger end cap 88 in sealing contact with the retention clip fingers 94 as shown in FIG. 7. In this way, the pressurized air 62 channeled into the plungers 54 is prevented from leaking from the housing 42 between the outboard plungers 54 and the housing endwall 52.

Referring again to FIGS. 1, 6, and 7, the tie rod 74 further includes a sliding joint between the two flange ends 98 for allowing relative longitudinal movement therebetween for accommodating thermal expansion and contraction as well as allowing easy assembly of the seal assembly 38. More specifically, the tie rod 74 is a cylindrical member having a distal end 106 which has a preferably rectangular cross-section. One of the flange ends 98 includes a generally rectangular bushing 108 having a generally rectangular bore 110 which receives the tie rod distal end 106 in longitudinal sliding movement therewith while preventing rotation of the tie rod 74 relative to the bushing 108. The bushing 108 is positioned in a complementary, generally rectangular hole 112 in the respective outboard plunger end-cap 88, which, therefore, prevents rotation of the tie rod 74 relative to the plungers 54.

The seal assembly 38 is assembled by joining together the adjacent plungers 54 at the respective tongues 86 and grooves 82 and then inserting the tie rod 74 through an end-cap 88 and the holes 84 in the respective first and second end-caps 78 and 80 of adjacent plungers 54, with the distal end 106 being finally inserted into the bushing 108 positioned in the hole 112. The two retention clips 92 are then positioned over the respective flange ends 98, and the plungers 54 are then positioned into the housing 42 with the retention clips 92 being positioned over the housing endwalls 52. The retention clips 92 are then suitably fixedly secured to the housing endwalls 52 by tack welding, for example.

Accordingly, the seal assembly 38 provides the articulated plungers 54 which may both translate outwardly from the housing 42 with the tie rod 74 sliding in the retention clip slots 96 to contact the nozzle sidewall 18, and allowing the plungers 54 to rotate perpendicularly relative to and with the flexing of the tie rod 74 as the pressurized air 62 causes the plungers 54 to follow, or conform to, the profile of the nozzle sidewall 18 as it deforms during operation. For example, if the nozzle sidewall 18 deforms to an arcuate, concave contour (the nozzle sidewall second contour 18c shown in FIG. 3) the pressurized air 62 will cause the plungers 54 to press against the nozzle sidewall 18 and bend the tie rod 74 in a similar arcuate, or bowed, profile. The plungers 54 will rotate in the transverse plane with the flexing tie rod 74 so that the plunger sealing lines 60 contact the nozzle sidewall 18 at least at two opposite points. In this way, the plunger sealing lines 60 conform to the nozzle sidewall 18, with the seal second contour 60b substantially matching the nozzle sidewall second contour 18c for reducing leakage of the exhaust gases 12 therebetween.

The tongue-in-groove joints 76 between adjacent plungers 54 prevent pivotal, or hinge-like, twisting (twist angle T) of the plungers 54 around the tie rod 74 for resisting the pressure loads of the exhaust gases 12 on the plungers 54 which would tend to rotate the plungers 54 about the tie rod 74, and which prevents an increase in the gap g and provides stability of the plungers 54 to prevent, or reduce, relative movement therebetween. The tongue-in-groove joints 76 also provide effective seals for preventing, or reducing, leakage of the exhaust gases 12 between adjacent plungers 54. The end-caps 78, 80, and 88 provide effective internal seals in the plungers 54 for preventing leakage of the pressurized fluid 62 between adjacent plungers 54 and outwardly from the plungers 54 at the tongue-in-groove joints 76 and at the housing end walls 52. Furthermore, the outboard end-caps 88 provide effective seals with the retention clip fingers 94 to prevent, or reduce, leakage of the pressurized air 62 from the housing 42 at those locations.

Another significant advantage due to the present invention may be appreciated from examination of FIG. 1. When the exhaust nozzle 14 is in its open position in this exemplary embodiment, at least one of the plungers 54, the outboard plunger 54, is positioned over the sidewall top edge 18a and floats freely without restraint from the sidewall 18. The tie rod 74, the tongue-in-groove joints 76, and the retention clips 92 prevent the loss of the outboard plunger 54 from the housing 42. And, more importantly, the outboard plunger 54 is maintained in alignment with the adjacent plunger 54 so that the seal lines 60 remain contiguous with each other for preventing one seal line 60 from being offset transversely relative to an adjacent seal line 60. This is important, for example, since the secondary flap 26 is movable to its closed position (as illustrated in FIG. 2) and the outboard plunger 54 must slide past the nozzle top edge 18a before it may contact again the nozzle sidewall 18. A smooth transition is required so that the free outboard plunger 54 illustrated in FIG. 1 does not bind or unnecessarily wear as it is moved over the sidewall top edge 18a as the secondary flap 26 is closed.

As illustrated in FIG. 4, each of the plungers 54 further preferably includes an impingement baffle 114 suitably fixedly secured inside the plunger 54 from one sidewall 56 around the top 58 and to the other sidewall 56. The baffle includes a plurality of spaced impingement holes 116 through which is channeled a portion of the pressurized air 62 for contacting the inner surface 118 of the plunger 54 for impingement cooling thereof. The pressurized air 62 used for impingement cooling is discharged from the plungers 54 through a plurality of film cooling apertures 120 in the sidewall 56 facing the exhaust gases 12.

While there has been described herein what is considered to be a preferred embodiment of the present invention, other modifications of the invention shall be apparent to those skilled in the art from the teachings herein, and it is, therefore, desired to be secured in the appended claims all such modifications as fall within the true spirit and scope of the invention.

For example, the individual lengths of the plungers 54 may be different, and any suitable number of plungers may be used including at least two.

Accordingly, what is desired to be secured by Letters Patent of the United States is the invention as defined and differentiated in the following claims. We claim:

1. A seal assembly for a gas turbine engine exhaust nozzle having an exhaust flap disposed adjacent to a nozzle sidewall for channeling exhaust gases comprising:
    a housing fixedly joinable to said exhaust flap and having an opening;
    a plurality of adjoining plungers slidably disposed in said housing and each including a top extending outside said housing opening for defining a seal line for contacting said nozzle sidewall for sealing said exhaust gases from flowing therebetween, said seal lines collectively defining a seal first contour being complementary to a first contour of said nozzle sidewall; and
    a tie rod extending through said plungers and joining said plungers to said housing, said tie rod being flexible for allowing said plungers to rotate perpendicularly with said tie rod so that said seal lines collectively form a seal second contour, different than said seal first contour, to conform to a second contour of said nozzle sidewall, different than said nozzle sidewall first contour.

2. A seal assembly according to claim 1 wherein adjacent ones of said plungers include tongue-in-groove joints for preventing twisting rotation of said plungers about said tie rod.

3. A seal assembly according to claim 2 wherein:
    each of said plungers seal lines is straight;
    said first contours of said seal lines and said nozzle sidewall are straight;
    said nozzle sidewall second contour is arcuate; and
    said seal second contour is arcuate.

4. A seal assembly according to claim 3 wherein said tie rod includes:
    opposite flange ends slidably joined to said housing for allowing translation of said plungers outwardly through said housing opening; and
    a sliding joint between said flange ends to allow relative longitudinal movement therebetween.

5. A seal assembly according to claim 3 wherein each of said plungers includes:
    a pair of spaced plunger sidewalls slidably disposed against sidewalls of said housing for providing a seal therebetween; and
    a pair of spaced, mating end-caps, adjacent ones thereof defining said tongue-in-groove joints, said end-caps being sealingly joined to said plunger sidewalls for sealing flow of a pressurized fluid between adjacent ones of said plungers.

6. A seal assembly according to claim 5 wherein said adjacent end-caps include:
    a first end-cap having an elongate groove disposed perpendicularly to said tie-rod;
    a second end-cap having an elongate tongue disposed perpendicularly to said tie rod; and
    said tongue being complementary in profile to said groove and being inserted into said groove for preventing twisting rotation of said adjacent plungers about said tie rod and for providing a seal therebetween.

7. A seal assembly according to claim 6 wherein said tongue includes an elongate recess, and said groove and said tongue recess of said adjacent plungers include spring biasing means for urging opposite outboard ones of said plungers against said housing in sealing contact therewith.

8. A seal assembly according to claim 7 wherein:
    each of said outboard plungers includes an outboard end-cap having an elongate recess;
    each of said tie rod flange ends is slidably joined between two fingers of a retention clip fixedly joined to said housing; and
    said spring biasing means urge said outboard plunger end-caps in sealing contact with said clip fingers.

9. A seal assembly according to claim 8 wherein said spring biasing means include a pair of opposing leaf springs each fixedly joined to a respective one of said adjacent plungers in said groove and said tongue recess.

10. A seal assembly according to claim 5 further including:
    an inlet in said housing;
    means for supplying said pressurized fluid into said housing through said inlet; and
    said plungers each including an opening for receiving said pressurized fluid and urging said plungers in sealing contact with said nozzle sidewall along said seal lines.

11. A seal assembly according to claim 5 wherein each of said plungers has a longitudinal length substantially equal to each other.

12. A seal assembly according to claim 11 including five of said plungers in said housing.

* * * * *